(12) United States Patent
Hawkins et al.

(10) Patent No.: US 12,006,984 B2
(45) Date of Patent: Jun. 11, 2024

(54) OPERATOR ASSEMBLY FOR MOVABLE BARRIER

(71) Applicant: Automatic Technology (Australia) Pty Ltd, Keysborough (AU)

(72) Inventors: Raymond Hawkins, Victoria (AU); Kanav Gupta, Victoria (AU); Travis Smith, Victoria (AU); Grant Nicholls, Victoria (AU)

(73) Assignee: Automatic Technology (Australia) Pty Ltd (AU)

( * ) Notice: Subject to any disclaimer, the term of this patent is extended or adjusted under 35 U.S.C. 154(b) by 0 days.

(21) Appl. No.: 17/453,211

(22) Filed: Nov. 2, 2021

(65) Prior Publication Data
US 2023/0013203 A1     Jan. 19, 2023

(30) Foreign Application Priority Data

Jul. 19, 2021 (AU) ................................ 2021206794

(51) Int. Cl.
*F16D 1/06* (2006.01)
*E06B 9/70* (2006.01)

(52) U.S. Cl.
CPC .... *F16D 1/06* (2013.01); *E06B 9/70* (2013.01)

(58) Field of Classification Search
CPC ...... E06B 9/70; E06B 9/68; F16D 1/06; F16D 1/10; F16D 3/48; F16D 3/72
See application file for complete search history.

(56) References Cited

U.S. PATENT DOCUMENTS

| | | | |
|---|---|---|---|
| 2009/0199979 A1* | 8/2009 | Nicholson | E06B 9/171 |
| | | | 160/188 |
| 2011/0275476 A1* | 11/2011 | Nicholson | E06B 9/174 |
| | | | 74/606 R |
| 2013/0133447 A1* | 5/2013 | Leivenzon | H02H 7/0851 |
| | | | 74/405 |
| 2022/0042551 A1* | 2/2022 | Huber | F16D 3/72 |
| 2022/0349253 A1* | 11/2022 | Diamond | E06B 9/42 |

FOREIGN PATENT DOCUMENTS

| | | |
|---|---|---|
| AU | 2004100416 A4 | 6/2004 |
| AU | 2006270591 B2 | 1/2007 |
| AU | 2010101382 A4 | 1/2011 |

* cited by examiner

*Primary Examiner* — Daniel P Cahn
*Assistant Examiner* — John W Hanes, Jr.
(74) *Attorney, Agent, or Firm* — BARNES & THORNBURG LLP; Jeffrey R. Stone

(57) ABSTRACT

The invention provides an operator for a roller closure. The operator includes an output drive comprising a rotating crown wheel. The crown wheel is configured to receive for attachment at least one output drive extension element selected from at least one first output drive extension element of a first size and shape or at least one second output drive extension element of a second, different size and shape, based on one or more physical characteristics of the particular drum wheel of the roller closure.

22 Claims, 6 Drawing Sheets

OPERATOR ASSEMBLY FOR MOVABLE BARRIER

FIELD OF THE INVENTION

The invention relates to an operator assembly for a moveable barrier. More particularly, it concerns the engagement between an output drive of an operator assembly and a roller door or shutter for a garage, shed or other premises.

BACKGROUND OF THE INVENTION

Moveable barrier operator assemblies are well known, one such assembly being that described in Australian Patent 2004100416 for a roller door. Typically, such an assembly includes a chassis supporting an electric motor within a housing, the assembly including a drive train from the motor which drives a final drive element connected to the roller door to cause the roller door to move up and down through operation of the motor. The roller door is mounted to roll and unroll on a frame including end drum wheels, the frame supported in position by brackets at both ends which hold a mounting axle passing axially through the roller door frame. The operator assembly is mounted at one end of the frame, between one end drum wheel and a bracket to which it is fixed.

The final drive element is generally an internally-toothed crown wheel meshing with the drive train and typically includes extension elements, such as suitably shaped prongs projecting away from the operator assembly body, that operatively engage with the adjacent drum wheel of the roller door frame. In one form, the crown wheel features two prongs which engage a spoke of the drum wheel in a generally U-shaped configuration, wherein the spoke of the drum wheel is captured by the two prongs extending respectively along the two sides of the spoke. Hence, in one direction of rotation of the crown wheel one of the prongs bears on the spoke to cause the rotation of the roller door, and in the other direction the other prong bears on the spoke to cause the rotation. In another form, the extension elements may be attached (eg. by bolts) to a suitable part of the roller door drum wheel.

It can be a significant inconvenience to an installer of such operator assemblies to accommodate different engagement requirements presented by different roller door types and configurations.

It is therefore desirable to provide an alternative operator assembly able to address at least partly the inconveniences of the prior art, or to provide a useful alternative to the prior art.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first form, the present invention provides an operator assembly for a movable barrier comprising a roller closure, the roller closure mounted on a rotating carrier assembly, the operator assembly including a motor with a motor output shaft, an output drive to transfer drive to the movable barrier, and a transmission assembly to transfer drive from the motor output shaft to the output drive, the output drive rotatable in a clockwise direction and in a counterclockwise direction, depending on whether the movable barrier is closing or opening, wherein the output drive comprises a rotating crown wheel with an outer face carrying a plurality of shaped attachment portions, each attachment portion configured to receive an output drive extension element to engage with a drum wheel comprised in said rotating carrier assembly, the drum wheel having one or more apertures located at specific positions, each aperture having a periphery, the operator assembly including at least one first output drive extension element of a first size and shape and at least one second output drive extension element of a second, different size and shape, each first and second output drive extension element comprising a base portion and an elongated extension portion, the base portion sized and shaped to be received in one or more of said rotating crown wheel outer face shaped attachment portions and the elongated extension portion sized and shaped to be received in an aperture of the rotating carrier assembly drum wheel in such a way as to bear on the periphery of the aperture irrespective of whether the output drive is rotating in a clockwise direction or in a counterclockwise direction, such that selection of the at least one first output drive extension element for attachment to the rotating crown wheel or the at least one second output drive extension element for attachment to the rotating crown wheel is made in accordance with the size(s) and location(s) of the aperture(s) in the particular drum wheel of the rotating carrier assembly.

Advantageously, the invention provides an operator assembly having output drive extension elements of different sizes and shapes that are each operatively engageable with the rotating crown wheel. This provides an installer with the option to select which of the first or second output drive extension elements to attach to the crown wheel based on particular physical characteristic(s) of the drum wheel of the rotating carrier assembly. In accordance with the invention, the installer is thus provided with a convenient kit, avoiding the need to select in advance all specification details of the operator assembly, but instead allowing employment of the parts of the kit that are deemed on site to be suitable for the particular roller closure application.

A further advantage arises in that the elongated extension portions are sized and shaped to be received in an aperture(s) of the rotating carrier assembly drum wheel in such a way as to bear on the periphery of the aperture irrespective of the direction of rotation of the output drive. This provides an effective and balanced transfer of loading from the rotating crown wheel to the drum wheel during operation, without the need to align multiple parts to facilitate drive in both directions.

In one embodiment, the base of each drive extension element is a skirt of larger area on the crown wheel outer face than the elongated extension portion. Preferably, the skirt of the first and second output drive extension elements are of substantially the same shape as each other, being of a complementary shape to the shaped attachment portions. The base of each drive extension element may include multiple stiffening web elements internal of an outer peripheral surface thereof, to assist in resisting lateral or other loads without deformation.

Each of the plurality of shaped attachment portions may include a recessed locating region enclosing one or more attachment points. Each drive extension element may be configured for attachment by multiple fasteners at multiple attachments points associated with the respective shaped attachment portion. For example, two fasteners may be used to affix a drive extension element at two attachments points associated with a respective shaped attachment portion. Preferably, at least two attachments points associated with the shaped attachment portion are angularly separated on the crown wheel, to assist in resisting lateral forces when rotating and driving the drum wheel.

In one embodiment, the elongated extension portion of at least one of the first or second output drive extension elements is substantially cylindrical, the outer surface of the cylinder engaging to bear on substantially the whole periphery of the drum wheel aperture. In an alternative embodiment, the elongated extension portion is non-cylindrical, having two opposed shaped surfaces respectively configured to bear on different parts of the periphery of the drum wheel aperture to provide driving force to the drum wheel in accordance with whether the output drive is rotating clockwise or counterclockwise. Having such two opposed shaped surfaces enables the elongated extension portion to be generally compatible with different shaped apertures that may be provided on the drum wheel. In one example, the elongated extension portion may be a closed curved form having in section two opposed generally arcuate sides of radius substantially matching the radius of a drum wheel aperture.

The elongated extension portion of at least one of the first or second output drive extension elements may be hollow and have multiple elongate stiffening webs internal of an outer surface. This further assists the extension portions in resisting lateral forces when rotating and driving the drum wheel.

The rotating crown wheel may include three shaped attachment portions, angularly equispaced about the crown wheel outer face, and preferably positioned at substantially the same radial distance from the centre of the crown wheel. Each of the plurality of shaped attachment portions may include mutually engaging locator means facilitating assembly between the rotating crown wheel and the drive extension elements. In one embodiment, the locator means includes at least one radially oriented flange and an elongated slot, whereby the at least one flange and slot are configured to complementarily engage with a recess and tab element, respectively, of the base portion of the drive extension element.

In a second form, the present invention provides an operator assembly for a movable barrier comprising a roller closure, the roller closure mounted on a rotating carrier assembly, the operator assembly including a motor with a motor output shaft, an output drive to transfer drive to the movable barrier, and a transmission assembly to transfer drive from the motor output shaft to the output drive, the output drive rotatable in a clockwise direction and in a counterclockwise direction, depending on whether the movable barrier is closing or opening, wherein the output drive comprises a rotating crown wheel with an outer face carrying a plurality of shaped attachment portions, each attachment portion configured to receive an output drive extension element to engage with a drum wheel comprised in said rotating carrier assembly, the operator assembly including at least one first output drive extension element of a first size and shape and at least one second output drive extension element of a second, different size and shape, each first and second output drive extension element comprising a base portion and an elongated extension portion, the base portion sized and shaped to be received by one or more of said rotating crown wheel outer face shaped attachment portions, such that selection of the at least one first output drive extension element for attachment to the rotating crown wheel or the at least one second output drive extension element for attachment to the rotating crown wheel is made in accordance with one or more physical characteristics of the particular drum wheel of the rotating carrier assembly.

The one or more physical characteristics of the drum wheel may include size, shape and/or location of one or more apertures disposed on the drum wheel. The one or more apertures may be located at specific, predetermined positions. Each of the one or more apertures may have a periphery, and each elongated extension portion may be sized and shaped to be received in the one or more apertures of the drum wheel in such a way as to bear on the periphery of the aperture irrespective of the direction of rotation of the output drive.

In one embodiment, each attachment portion is configured to receive an output drive extension element to engage directly with a drum wheel comprised in said rotating carrier assembly. Alternatively, the engagement of an output drive extension element with a drum wheel may be indirect, for example the output drive extension element(s) may be components of a multi-part assembly.

Preferably, the elongated extension portion projects in a substantially axial direction.

Preferably, the base portion of an output drive extension element is received in an attachment portion of the crown wheel outer face. Alternatively, the output drive extension element can be received by two or more attachment portions of the crown wheel outer face.

It will be appreciated that features disclosed with respect to the first form of the invention are also applicable with respect to the second form described above, including different combinations of features disclosed.

In a further aspect, the present invention provides the abovementioned operator assembly (in accordance with either form of the invention) in combination with a drum wheel of a rotating carrier assembly.

In a further aspect, the present invention provides the abovementioned operator assembly (in accordance with either form of the invention) in combination with a rotating carrier assembly of a roller closure.

In a further aspect, the present invention provides the abovementioned operator assembly (in accordance with either form of the invention) in combination with a roller closure.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
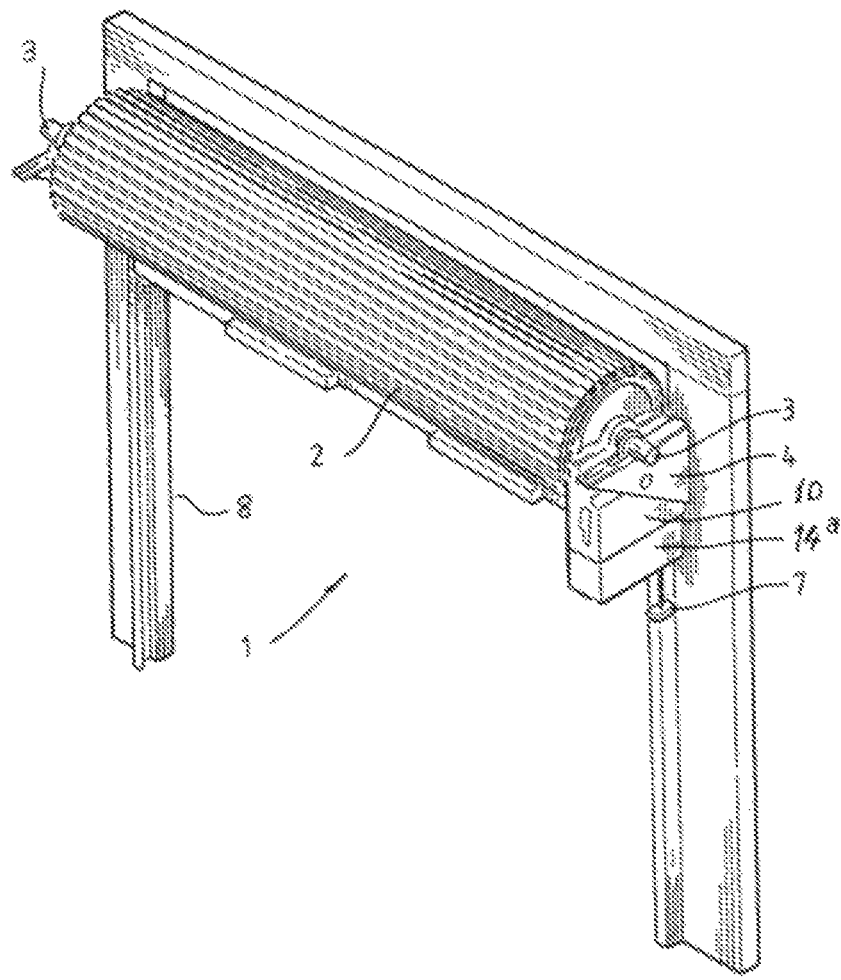
FIG. 1 is a perspective view of a typical roller door system.

Referring to FIG. 1, the roller door system 1 includes a drum-mounted roller door 2 on an axle 3 mounted to two end brackets 4. At one end of the axle 3 is mounted a drive unit 10 including an electric motor and a drive gear train (not shown), as well as an electronic controller unit controlling operation of the motor within a portion 14a of the drive unit. Drive unit 10 is provided with a disengagement pull handle 7 for actuating a clutch for disengagement of the drive train if manual operation of roller door 2 is required at any time. FIG. 1 also shows the garage door opening, defined by outer frame 8. It is to be noted that drive unit 10 illustrated in FIG. 1 is of generally conventional form (for example, of the general form described and illustrated in Australian Patent 2004100416). However, there are notable differences between the present invention and the prior art drive units, described in greater detail below.

In order to drive movement of roller door 2 (i.e. to roll up and unroll the door in order to open and close the garage door opening), drive unit 10 includes as its final drive element an internally-toothed gear drum mounted for rotation and provided with one or more drive extension elements projecting in the axial direction from an outer face thereof (ie. in a direction parallel to the longitudinal axis of axle 3 once drive unit 10 is in place), for engagement with one or more complementary features of a drum wheel (not shown in FIG. 1) about which roller door 2 is mounted. The drive train of drive unit 10 transfers drive from the output shaft of the electric motor to the gear drum, the internal teeth of the gear drum engaging with the teeth of a driven pinion gear of the drive train. Thus, operation of the drive unit electric motor rotates the gear drum and thus the roller door drum wheel, resulting in rolling/unrolling of roller door 2.

An issue identified by the inventors is that the drum wheels of roller doors can vary significantly across different roller door manufacturers or between different jurisdictions, which may each have their own standard drum wheel configurations. This means that drive units having gear drums that are incompatible with a given roller door drum wheel are rendered ineffectual. As will be explained in the below described embodiments, the provision of a roller door system with different forms of output drive extensions enables an installer to select an output drive extension for attachment to the gear drum in accordance with one or more physical characteristics (e.g. the size, shape and/or location of one or more apertures) of the particular drum wheel of the door drum.

Figure 2B:
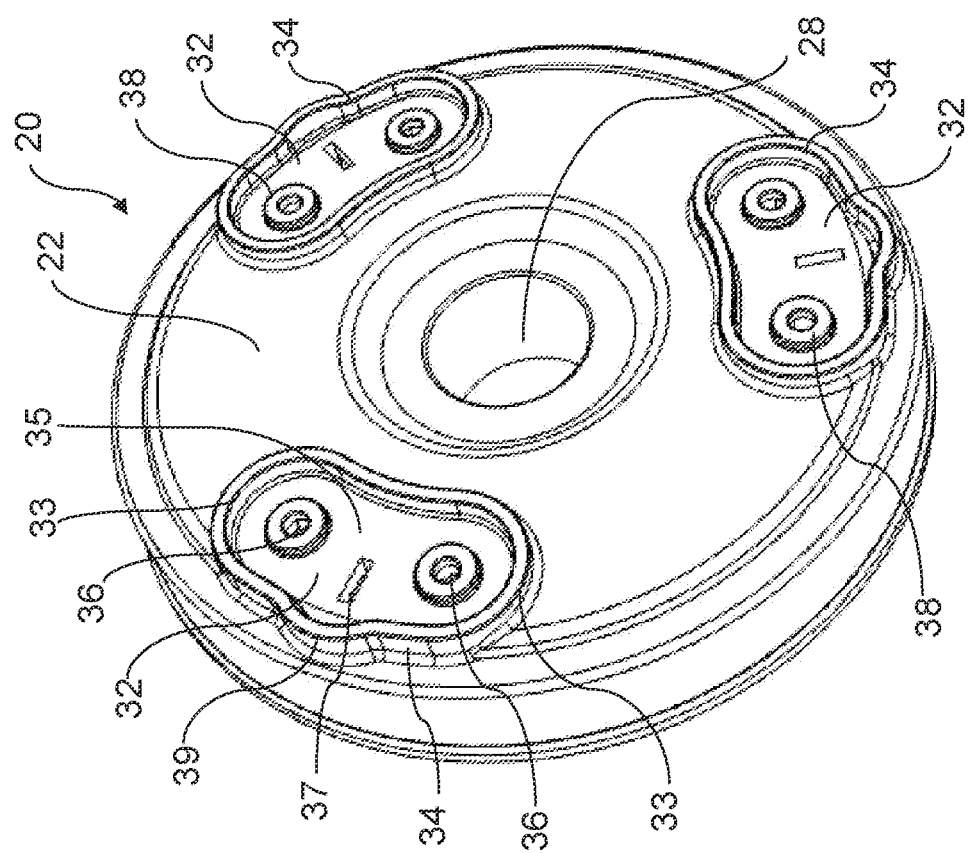
FIG. 2B is a front perspective view of the gear drum of FIG. 2A.
Figure 2A:
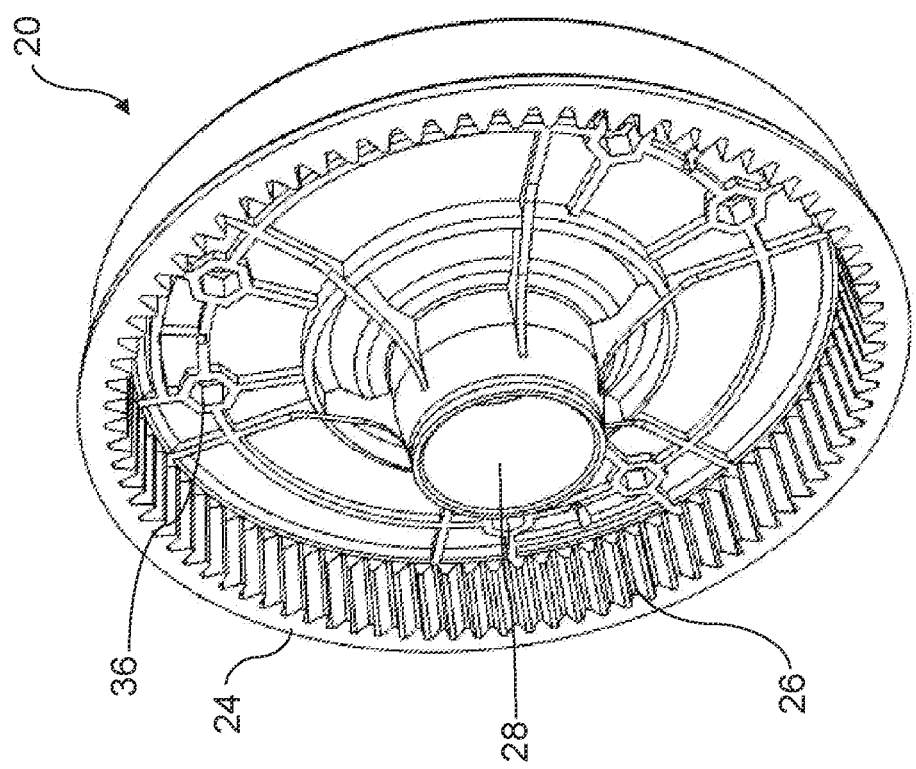
FIG. 2A is a rear perspective view of a gear drum in accordance with an embodiment of the invention.

Reference is now made to FIGS. 2A and 2B, which illustrate a gear drum 20 in accordance with one embodiment of the invention. The gear drum 20 is of generally circular shape, taking the form of a rotating crown wheel, and includes an outer face 22 and an inner side 24. When drive unit 10 is installed in the roller door system 1, the outer surface 22 of gear drum 20 faces towards and engages the adjacent drum wheel which forms part of a rotating carrier assembly to which the door is mounted (ie. the door drum), whilst the inner side 24 of gear drum 20 is arranged to operatively engage with the drive train of drive unit 10. In particular, the teeth of a drive pinion gear (not shown) operatively engage the internal gear teeth 26 of the gear drum inner side 24, thereby causing gear drum 20 to rotate clockwise or anticlockwise depending on the direction of motor rotation and whether the roller door is being opened or closed.

Drive unit 10 is installed over roller door axle 3 via a tubular sleeve (not shown) around which bore 28 of gear drum 20 rotates. Drive unit 10 is fixedly attached to axle 3 by way of a suitable clamping arrangement. Gear drum 20 is suitably retained against axial movement by a suitable restraining means (eg. a circlip).

Outer face 22 includes a plurality of shaped attachment portions 32, each configured to releasably receive the base of an output drive extension element 40, 60 (see FIGS. 3A-4B). A total of three like attachment portions 32 are depicted in FIG. 2B, but it will be appreciated that any suitable number of shaped attachment portions 32 may be provided. The shaped attachment portions 32 are angularly equispaced about the outer driving face 22 of the gear drum 20 (ie. at separations of 120°), all positioned at the same radial position relative to a centre of gear drum 20. It will of course be appreciated that an alternative arrangement of shaped attachment portions 32 may be utilised.

The attachment portions 32 each include a peripheral flange 34 projecting axially from outer face 22. Flange 34 is a closed, curved shape having two opposed rounded end portions 33 joining two generally arcuate portions, the outer of which features a radially protruding rounded central part 39 extending in a generally radial direction. Flange 34 therefore defines an enclosed recessed locating region 35 configured to receive therein the complementary base of an output drive extension element 40, 60, discussed in greater detail below.

Flange 34 encloses two through holes 36, each configured to receive a fastener for affixing output drive extension element 40, 60 to gear drum 20. The through holes 36 are angularly separated from one another around gear drum 20, to assist in resisting lateral forces when output drive extension element 40, 60 is attached to gear drum 20 (see FIGS. 5A-6B). An annular rim 38 projects from outer face 22 and surrounds each through hole 36. Annular rim 38 is configured to engage with a complementary recess 41, 61 provided in base portion 42, 62 of extension elements 40, 60 (see FIGS. 3B and 4B). Flange 34 also encloses an elongated slot 37, oriented in the radial direction, disposed between the two through holes 36 and configured to receive a complementary shaped tab 43, 63 extending from base portion 42, 62 of extension element 40, 60. Slot 37 and rims 38 thus act as locating features, facilitating assembly and firm engagement between gear drum 20 and extension elements 40, 60.

Figure 3B:
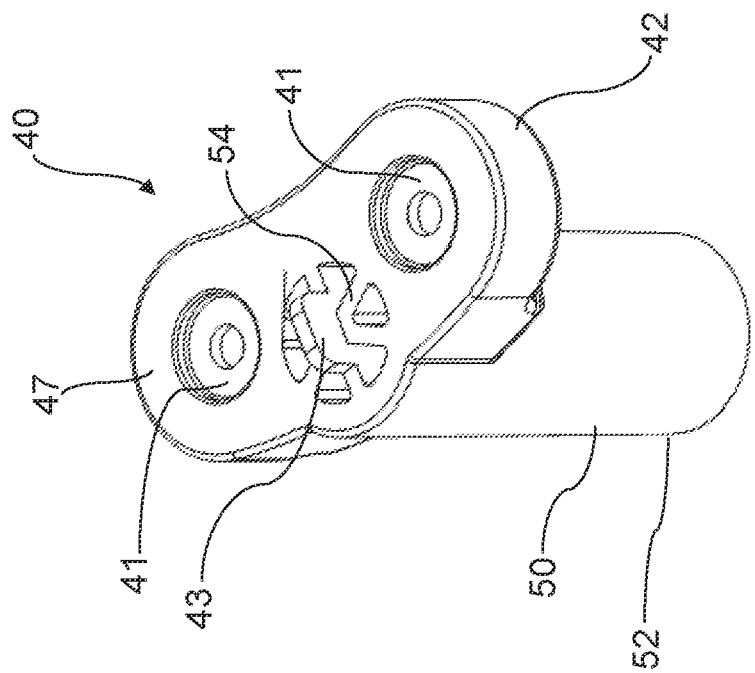
FIG. 3B is a rear perspective view of the first output drive extension element of FIG. 3A.
Figure 3A:
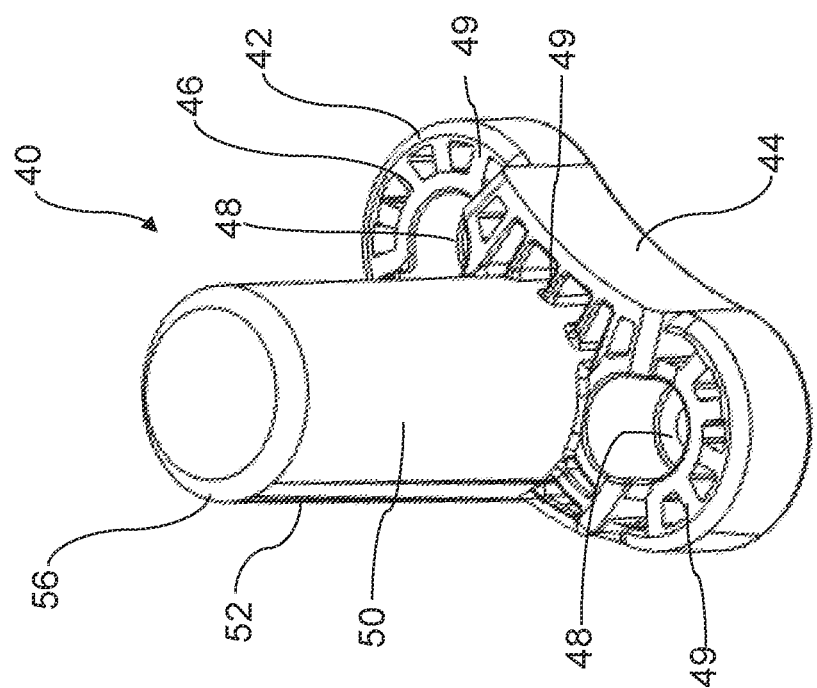
FIG. 3A is a front perspective view of a first output drive extension element in accordance with an embodiment of the invention.

Reference is now made to FIGS. 3A and 3B, which illustrate one embodiment of a first output drive extension element 40. Extension element 40 includes base portion 42 having a peripheral flange 44 with a complementary shape to flange 34, so that base portion 42 can be received within recessed locating region 35. Base portion 42 includes an outer side 46 and an opposite inner face 47. Through holes 48 extend between outer side 46 and inner face 47, one at either side of base portion 42 as shown, positioned to align with through holes 36 of shaped attachment portion 32 when base portion 42 of extension element 40 is positioned within recessed locating region 35. Extension element 40 can thus be securely attached to gear drum 20 by suitable threaded fasteners (not shown) passed through through holes 48 and through hole 36 and secured to threaded nuts (not shown) held in shaped recesses on the inner side 24 of gear drum 20 as shown in FIG. 2A.

Outer side 46 of base portion 42 includes multiple stiffening web elements 49 internal of peripheral flange 44. Web elements 49 are generally disposed across a substantial part of base portion 42 and assist in strengthening element 40, particularly in resisting lateral forces when gear drum 20 is driving drum wheel 80.

Inner face 47 of base portion 42 is a substantially planar surface with a pair of circular recesses 41 centred on through holes 48 as shown, recesses 41 configured to receive the two projecting annular rims 38 of gear drum 20 as described above. Axially projecting tab 43 extends from inner face 47, between recesses 41. Tab 43 is of complementary shape to slot 37 of gear drum 20. As will be understood, extension element 40 is securely and firmly located in a particular position and orientation on gear drum 20 by the mutual engagement of peripheral flange 44, tab 43 and recesses 41 with flange 34, slot 37 and projecting annular rims 38, respectively.

Extension element 40 further includes an elongated extension portion 50 extending in an axial direction from base portion 42. Extension portion 50 is sized and shaped to be received in an aperture 82 (best shown in FIG. 5B) of drum wheel 80 in such a way as to bear on the periphery of the aperture irrespective of whether the gear drum 20 is rotating in a clockwise direction or in a counterclockwise direction. Extension portion 50 is substantially cylindrical in shape with a slight taper, configured to engage complementary shaped aperture 82. In particular, the outer surface 52 of the cylindrical extension portion 50 bears on substantially the whole periphery of aperture 82. Thus, operative engagement of gear drum 20 with drum wheel 80 is achieved by insertion of extension portion 50 into aperture 82 (discussed further below).

Extension portion 50 is hollow and includes multiple elongate internal stiffening webs 54 running along substantially the whole length of extension portion 50. Extension portion 50 also includes a chamfered free end 56 enabling ease of insertion of extension portion 50 into aperture 82 of drum wheel 80.

Figure 4B:
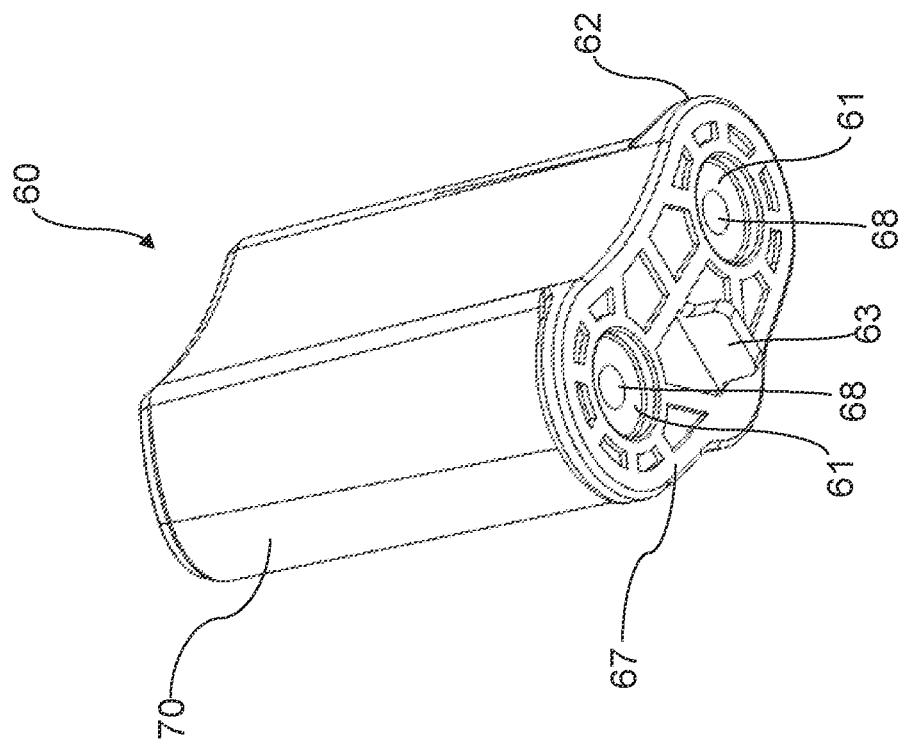
FIG. 4B is a rear perspective view of the second output drive extension element of FIG. 4A.
Figure 4A:
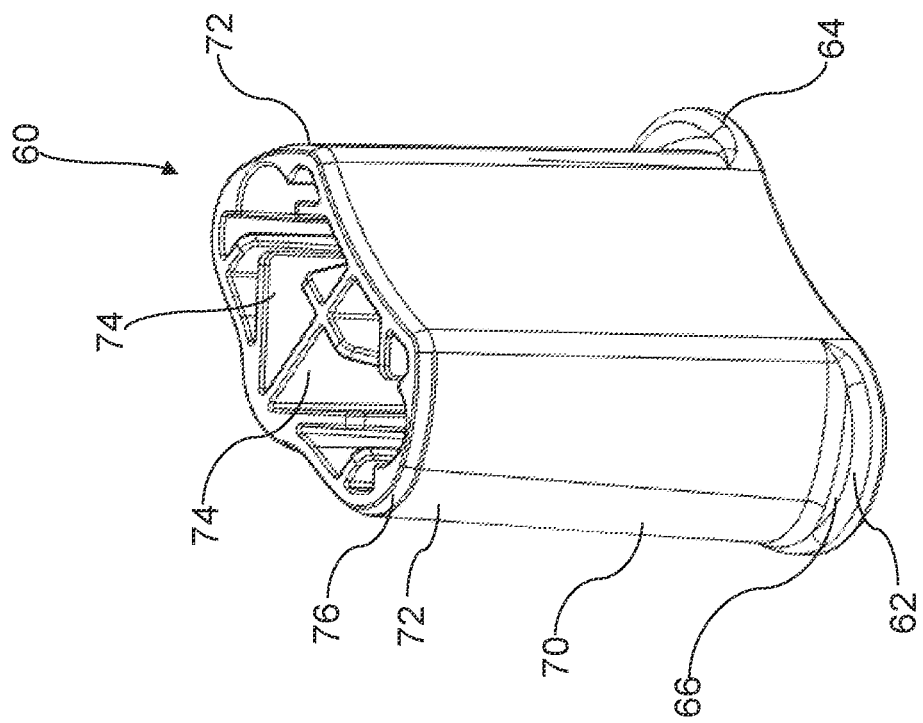
FIG. 4A is a front perspective view of a second output drive extension element in accordance with an embodiment of the invention.

Reference is now made to FIGS. 4A and 4B, which illustrate one embodiment of a second output drive extension element 60. Extension element 60 includes a base portion 62 having a skirt 64 with a complementary peripheral shape to flange 34, so that base portion 62 can be received within recessed locating region 35. Base portion 62 includes an outer side 66 and an opposite inner face 67.

Inner face 67 of base portion 62 provides a generally planar surface with a pair of circular recesses 61, configured to receive the two projecting annular rims 38 of gear drum 20 as described above. Axially projecting tab 63 extends from inner face 67, between recesses 61. Tab 63 is of complementary shape to slot 37 of gear drum 20. Thus, extension element 60 may be securely and firmly located in a particular position and orientation relative to gear drum 20 by the mutual engagement of skirt 64, tab 63 and recesses 61 with flange 34, slot 37 and projecting annular rims 38.

Extension element 60 further includes an elongated extension portion 70 extending in an axial direction from base portion 62. Extension portion 70 is sized and shaped to be received in an aperture 86 of drum wheel 84 (best shown in FIG. 6B) in such a way as to bear on the periphery of the aperture 86 irrespective of whether the output drive is rotating in a clockwise direction or in a counterclockwise direction. As can be seen in FIG. 4A, extension portion 70 is of somewhat similar shape to base portion 62, ie. having in section a bean-shaped profile, having a slight taper from its base to its free end 76. Extension portion 70 includes opposed surfaces 72 of arcuate shape, respectively configured to bear on opposed parts of the periphery of aperture 86 to provide the driving force to the drum wheel 84 in accordance with whether the output drive is rotating clockwise or counterclockwise. Thus, operative engagement of gear drum 20 with drum wheel 84 is achieved by insertion of extension portion 70 into the aperture 86 of the drum wheel 84 (discussed further below).

Extension portion 70 is hollow and includes multiple elongate internal stiffening webs 74 running substantially along the whole length of extension portion 70. These stiffening web elements 74 assist in resisting lateral forces experienced by extension element 60.

The stiffening web elements 74 and the inner wall of extension element 60 are formed to provide two generally tubular throughways which terminate in through holes 68 through base portion 62 concentric with circular recesses 61, as shown in FIG. 4B. Through holes 68 are positioned to align with through holes 36 of shaped attachment portion 32 when base portion 62 of extension element 60 is positioned within recessed locating region 35. Extension element 60 can thus be securely attached to gear drum 20 by suitable threaded fasteners (not shown) passed through through holes 68 and through holes 36, and secured to threaded nuts (not shown) held in shaped recesses on the inner side 24 of gear drum 20 as shown in FIG. 2A. As will be understood, as the through holes 68 are within the footprint of extension portion 70, the tubular throughways provided by the internal form of extension element 60 allow access to apply a suitable tool (eg. screwdriver or socket) to the fasteners.

Extension portion 70 also includes a chamfered free end 76 enabling ease of insertion in an aperture of the drum wheel 84.

As will be appreciated, the identical shape of peripheral flange 44 of first output drive extension element 40 and skirt 64 of second output drive extension element 60 allows an installer to select from between element 40 (or a plurality of such elements) or element 60 (or a plurality of such elements) for attachment to the gear drum 20, depending on the size, shape and location of one or more of the apertures in the particular drum wheel encountered. The precise location of peripheral flange 44 and skirt 64 in recessed locating region 35 results in a precise location and position of extension portions 50 and 70, to engage accurately with the complementary part of drum wheel 80, 84.

Assembly of the extension elements 40, 60 to gear drum 20 is achieved by locating the base of each extension element 40, 60 in a recessed locating region 35 on gear drum outer face 22, and then securing by way of the threaded fasteners and nuts. Disassembly is achieved by undoing the fastener and pulling each extension element 40, 60 from the gear drum 20.

Drive unit 10 is provided as a kit to an installer, including suitable extension elements 40, 60 (for example, three of each). Naturally, additional extension elements of different forms may also be provided in the kit, to suit yet other drum wheels.

Figure 5B:
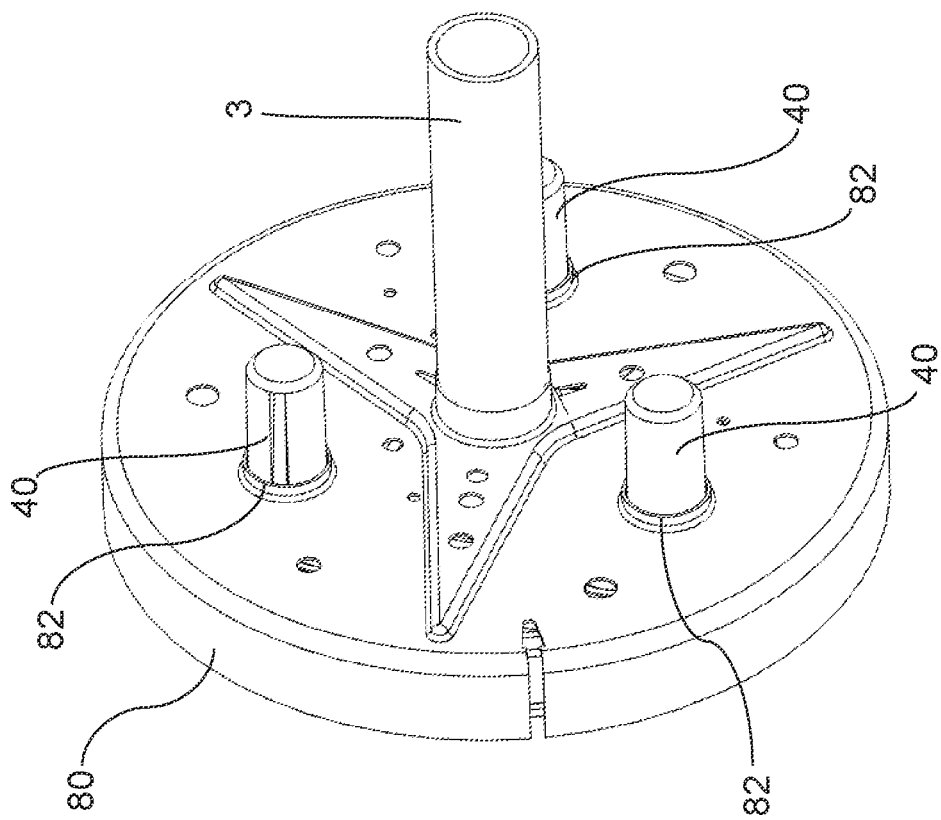
FIG. 5B is a front perspective view of FIG. 5A.
Figure 5A:
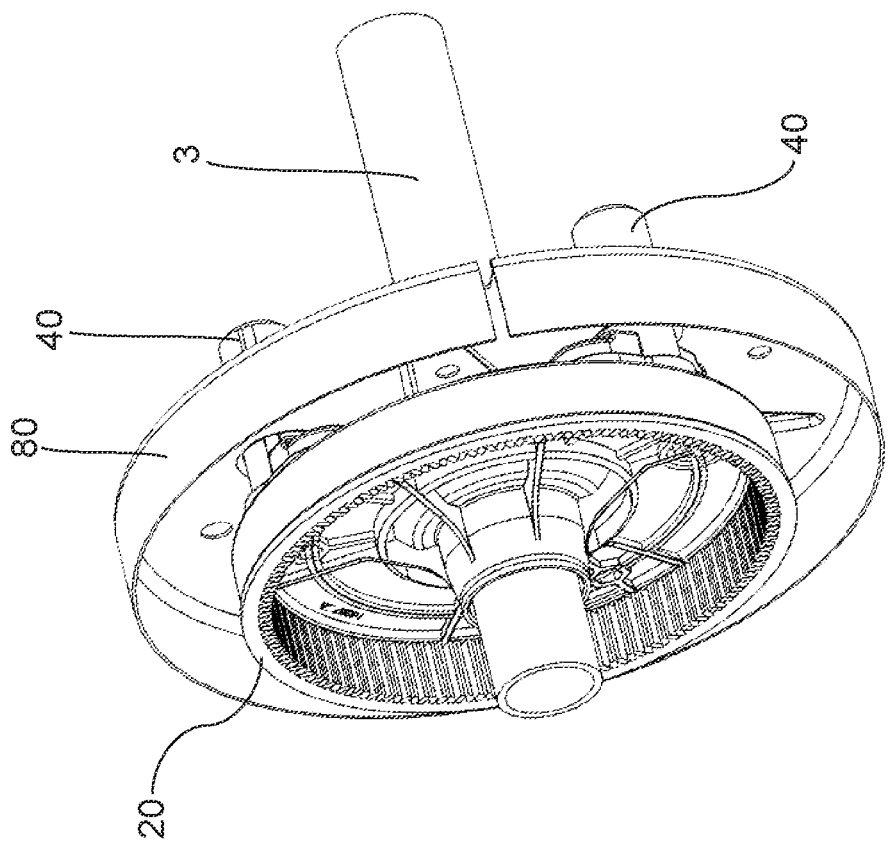
FIG. 5A is a rear perspective view of an operator assembly in accordance with an embodiment of the present invention showing operative engagement of a gear drum with a roller door drum wheel using the first output drive extension element.

FIGS. 5A and 5B illustrate the operative engagement between gear drum 20 (arranged for rotation around axle 3) and drum wheel 80. As will be understood, the other components of drive unit 10 are not shown in these figures.

On the basis of the size and location of apertures 82, the installer fits gear drum 20 with three first extension elements 40, as shown. Extension portions 50 pass through apertures 82 and are sized and positioned in such a way as to bear on the whole periphery of each aperture 82, so providing substantially play-free drive of drum wheel 80 (and thus the roller door) in both directions. Whilst three extension elements 40 are used in the depicted embodiment, it will be appreciated that fewer can be used if desired, eg. in accordance with the operational load requirements of the system.

Figure 6B:
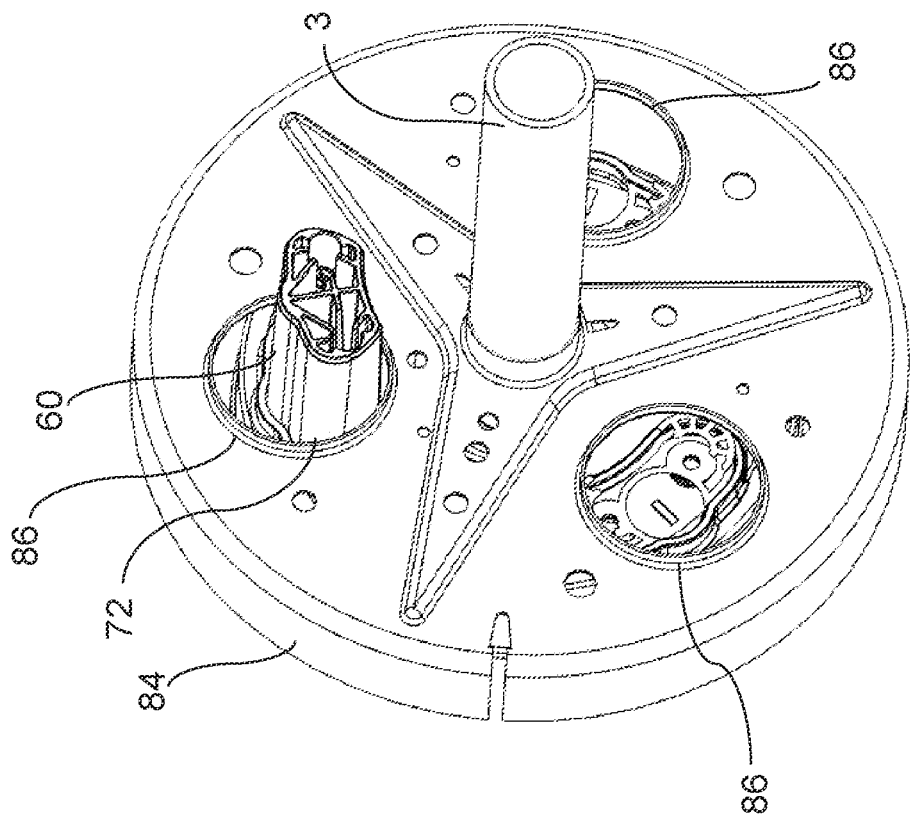
FIG. 6B is a front perspective view of FIG. 6A.
Figure 6A:
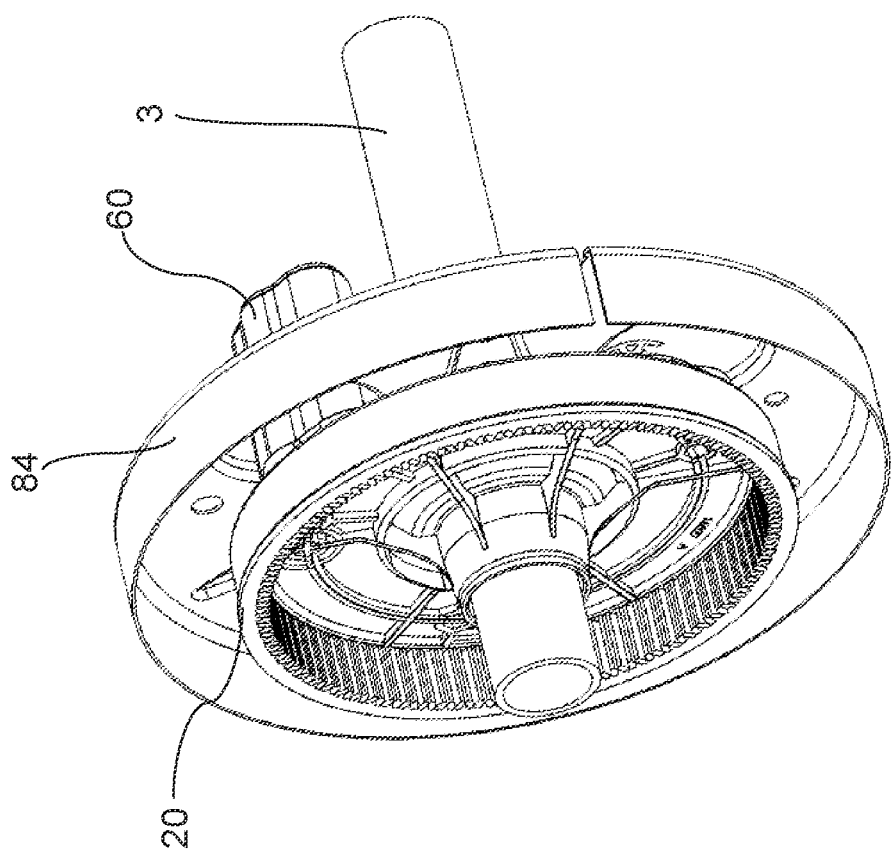
FIG. 6A is a rear perspective view of an operator assembly in accordance with an embodiment of the present invention showing operative engagement of a gear drum with a different roller door drum wheel using the second output drive extension element.

In a similar way, FIGS. 6A and 6B illustrate the operative engagement between gear drum 20 and alternative drum wheel 84. On the basis of the size and location of apertures 86, the installer fits gear drum 20 with a second extension element 60. Extension portion 70 passes through aperture 86 and is sized and positioned in such a way that the two opposed arcuate surfaces 72 bear on opposite parts of the periphery of aperture 86, providing substantially play-free drive of drum wheel 84 (and thus the roller door) in both directions. Whilst only one extension element 60 is shown in the depicted embodiment, this is only for clarity of illustration. Preferably two or more extension elements 60 are used, and the number can be selected in accordance with the operational load requirements of the system.

Thus, the present invention simplifies issues that can be encountered in the field by providing an operator assembly for a roller door including different output drive extension elements of different sizes and shapes, all designed to be attached to a common gear drum. The installer is thus able to select and use the appropriate output drive extension elements for the particular drum wheel encountered at the door site. The particular form of the output drive extension elements and the way they can be received in drum wheel apertures to bear against the periphery allows each extension element to contribute to drive in both directions of rotation. This assists in effective and balanced power transfer from the gear drum to the drum wheel during operation.

The gear drum 20 and the extension elements 40, 60 may be made of any suitable material to meet the intended operational requirements of drive unit 10. For example, gear drum 20 can be formed of a composite plastic material, and extension elements 40, 60 can be formed of nylon 66 with 23% glass fibres. Exemplary dimensions for the diameter of gear drum 20 is between 200-250 mm. Exemplary dimensions of the surface area of the base portion of extension elements 40, 60 is approximately 70-80 mm×30-40 mm. Exemplary dimensions of the extension portion of extension elements 40 are a diameter of between about 25-35 mm, and a length of about 50-90 mm from the respective base portion. Exemplary dimensions of the extension portion of extension elements 60 are a diameter of between about 30-45 mm, and a length of about 50-90 mm from the respective base portion.

As previously mentioned, extension portions 50, 70 include a slight taper, of between about 0.5° and 1°. This slight taper has two primary functions. Firstly it assists in the fabrication (mould release). Secondly, it enables the extension portions 50, 70 to be moved into engagement with apertures 82, 86 until the required engagement between the extension portions 50, 70 and the periphery of the apertures is achieved. As noted above, although not essential, a close fit is desirable, as it provides a substantially play-free drive of drum wheel 84 in both directions of rotation.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An operator for a movable barrier, the movable barrier comprising a roller closure, the roller closure mounted on a rotating carrier assembly, the operator including an output drive to transfer drive to the movable barrier, and a transmission assembly to transfer drive to the output drive, the output drive rotatable in a clockwise direction and in a counterclockwise direction, depending on whether the movable barrier is closing or opening, wherein the output drive comprises a rotating crown wheel with an outer face carrying a plurality of shaped attachment portions, each attachment portion configured to receive an output drive extension element to engage with a drum wheel comprised in said rotating carrier assembly, the drum wheel having one or more apertures located at specific positions, each aperture having a periphery, the operator including at least one first output drive extension element of a first size and shape and at least one second output drive extension element of a second, different size and shape, each first and second output drive extension element comprising a base portion and an elongated extension portion, the base portion sized and shaped to be received in one or more of said rotating crown wheel outer face shaped attachment portions and the elongated extension portion sized and shaped to be received in said one or more apertures of the rotating carrier assembly drum wheel in such a way as to bear on the periphery of the respective aperture irrespective of whether the output drive is rotating in a clockwise direction or in a counterclockwise direction, wherein said different size and shape of the second output drive extension element relative to the first output drive extension element incudes the elongated extension portion of the second output drive extension element having a different cross-sectional shape to the elongated extension portion of the first output drive extension element, wherein the crown wheel is configured to receive for attachment at least one output drive extension element selected from the at least one first output drive extension element and the at least one second output drive extension element based on the size and location of each aperture in the particular drum wheel of the rotating carrier assembly.

2. An operator for a movable barrier, the movable barrier comprising a roller closure, the roller closure mounted on a rotating carrier assembly, the operator comprising an output drive to transfer drive to the movable barrier, and a transmission assembly to transfer drive to the output drive, the output drive rotatable in a clockwise direction and in a counterclockwise direction, depending on whether the movable barrier is closing or opening, wherein the output drive comprises a rotating crown wheel with an outer face carrying a plurality of shaped attachment portions, each attachment portion configured to receive an output drive extension element to engage with a drum wheel comprised in said rotating carrier assembly, the operator including at least one first output drive extension element of a first size and shape and at least one second output drive extension element of a second, different size and shape, each first and second output drive extension element comprising a base portion and an elongated extension portion, the base portion sized and shaped to be received by one or more of said rotating crown wheel outer face shaped attachment portions, wherein said different size and shape of the second output drive extension element relative to the first output drive extension element includes the elongated extension portion of the second output drive extension element having a different cross-sectional shape to the elongated extension portion of the first output drive extension element wherein the crown wheel is configured to receive for attachment at least one output drive extension element selected from the at least one first output drive extension element and the at least one second output drive extension element based on one or more physical characteristics of the particular drum wheel of the rotating carrier assembly.

3. The operator of claim 2, wherein the one or more physical characteristics of the drum wheel include size of one or more apertures disposed on the drum wheel, shape of one or more apertures disposed on the drum wheel and/or location of one or more apertures disposed on the drum wheel.

4. The operator of claim 3, wherein each of the one or more apertures has a periphery, and each elongated extension portion may be sized and shaped to be received in the one or more apertures of the drum wheel in such a way as to bear on the periphery of the aperture irrespective of the direction of rotation of the output drive.

5. The operator according to claim 2, wherein the base portion of each drive extension element includes a skirt of larger area on the crown wheel outer face than the elongated extension portion.

6. The operator according to claim 5, wherein the skirt of the first and second output drive extension elements are of substantially the same cross-sectional shape as each other, being of a complementary shape to the shaped attachment portions.

7. The operator according to claim 2, wherein the base portion of each drive extension element includes multiple stiffening web elements internal of an outer peripheral surface thereof.

8. The operator according to claim 2, wherein each of the plurality of shaped attachment portions includes a recessed locating region enclosing one or more attachment points.

9. The operator according to claim 8, wherein each drive extension element is configured for attachment by multiple fasteners at multiple attachments points associated with the respective shaped attachment portion.

10. The operator according to claim 9, wherein two fasteners affix a drive extension element at two attachments points associated with a respective shaped attachment portion.

11. The operator according to claim 10, wherein at least two attachments points associated with the shaped attachment portion are angularly separated on the crown wheel, to assist in resisting lateral forces when rotating and driving the drum wheel.

12. The operator according to claim 2, wherein the elongated extension portion of at least one of the first or second output drive extension elements comprises an outer surface, the outer surface configured to engage to bear on substantially a whole periphery of a drum wheel aperture.

13. The operator according to claim 4, wherein the elongated extension portion of at least one of the first or second output drive extension elements is non-cylindrical, having two opposed shaped surfaces respectively configured to bear on different parts of the periphery to provide the driving force to the drum wheel in accordance with whether the output drive is rotating clockwise or counterclockwise.

14. The operator according to claim 2, wherein the elongated extension portion of at least one of the first or second output drive extension elements is hollow with multiple elongate stiffening webs internal of an outer surface.

15. The operator according to claim 2, wherein the plurality of shaped attachment portions includes three shaped attachment portions, angularly equispaced about the crown wheel outer face, and positioned at substantially the same radial distance from the centre of the rotating crown wheel.

16. The operator according to claim 2, wherein each of the plurality of shaped attachment portions includes mutually engaging locating features.

17. An operator assembly including the operator according to claim 2, further including the drum wheel of the rotating carrier assembly.

18. An operator assembly including the operator according to claim 2, further including the rotating carrier assembly of the roller closure.

19. An operator assembly including the operator according to claim 2, further including the roller closure.

20. The operator according to claim 2, wherein the shape of the base portion of the first output drive extension element and the base portion of the second output drive extension element is such that the respective output drive extension elements can be secured to each of the plurality of shaped attachment portions in a fixed orientation.

21. The operator according to claim 20, wherein each of the plurality of shaped attachment portions includes a recessed locating region and a peripheral flange projecting axially from the outer face of the rotating crown wheel, wherein the base portion of the first output drive extension element and the base portion of the second output drive extension element have a complementary peripheral shape to the flange, so that the base portion can be received within the recessed locating region in the fixed orientation.

22. A kit for operating a roller closure, the kit comprising:
an operator comprising an output drive to transfer drive to the roller closure, the operator comprising a rotating crown wheel having an outer face carrying a plurality of shaped attachment portions, each attachment portion configured to receive an output drive extension element to engage with a roller closure drum wheel, the roller closure drum wheel having one or more apertures located at specific positions, each aperture having a periphery,
at least one first output drive extension element of a first size and shape,
at least one second output drive extension element of a second, different size and shape, wherein each first and second output drive extension element comprises a base portion and an elongated extension portion, the base portion sized and shaped to be received in one or more of said rotating crown wheel outer face shaped attachment portions and the elongated extension portion sized and shaped to be received in an aperture of the roller closure drum wheel in such a way as to bear on the periphery of the aperture irrespective of whether the output drive is rotating in a clockwise direction or in a counterclockwise direction, wherein said different size and shape of the second output drive extension element relative to the first output drive extension element includes the elongated extension portion of the second output drive extension element having a different cross-sectional shape to the elongated extension portion of the first output drive extension element, wherein the crown wheel is configured to receive for attachment at least one output drive extension element selected from the at least one first output drive extension element or the at least one second output drive extension element based on the size and location of each aperture in the particular drum wheel.

\* \* \* \* \*